United States Patent [19]

Bauer et al.

[11] Patent Number: 5,180,459
[45] Date of Patent: Jan. 19, 1993

[54] PROCESS FOR PRODUCING SEALING COMPONENTS FROM ALL-CARBON COMPOSITE MATERIAL

[75] Inventors: Jean-Michel Bauer; Maurice Bontems, both of Pagny S/Moselle, France

[73] Assignee: Le Carbone Lorraine, Courbevoie, France

[21] Appl. No.: 735,892

[22] Filed: Jul. 25, 1991

[30] Foreign Application Priority Data

Jul. 26, 1990 [FR] France .................. 90-09803

[51] Int. Cl.⁵ .................. B32B 31/18; B32B 31/20; C01B 31/02
[52] U.S. Cl. .................. 156/89; 156/251; 156/267; 156/307.7; 264/29.5; 264/152; 264/163; 264/296; 423/448
[58] Field of Search .......... 264/29.1, 29.5, 152, 264/163, 296; 156/89, 155, 251, 267, 307.1, 307.7; 423/449

[56] References Cited

U.S. PATENT DOCUMENTS 4,777,083 10/1988 Ono et al. .................. 156/89 X

FOREIGN PATENT DOCUMENTS 231787 8/1987 European Pat. Off. .
62-105910 5/1987 Japan .
63-242395 10/1988 Japan .
1-308872 12/1989 Japan .
2205906 12/1988 United Kingdom .

Primary Examiner—Leo B. Tentoni
Attorney, Agent, or Firm—Dennison, Meserole, Pollack & Scheiner

[57] ABSTRACT

Process for producing carbon composite components having an edge and a central part with at least one layer of carbon/carbon composite and at least one layer of recompressed expanded graphite to obtain a sealing carbon composite component with a central part having a high deformation level and/or with an edge providing self-bonding of the layers of the component. There is prepared a stack of at least one layer of preimpregnate based on carbon fiber and of at least one layer of expanded graphite of a specific gravity of between 0.03 and 0.06. The stack is compressed under a pressure of between 2.5 and 15 MPa and at a temperature of between 50° and 200° C., in such a way that the thickness of the edge is at least equal to that of the central part and the specific gravity of the expanded graphite is between 0.3 and 0.6 for the edge and between 1 and 1.5 for the central part. The compressed component is treated thermally at a temperature of between 400° and 3000° C. Composite components produced according to this process and their use in the production of heat-exchanger plates and pervaporation modules also is disclosed.

8 Claims, 5 Drawing Sheets

FIG. II
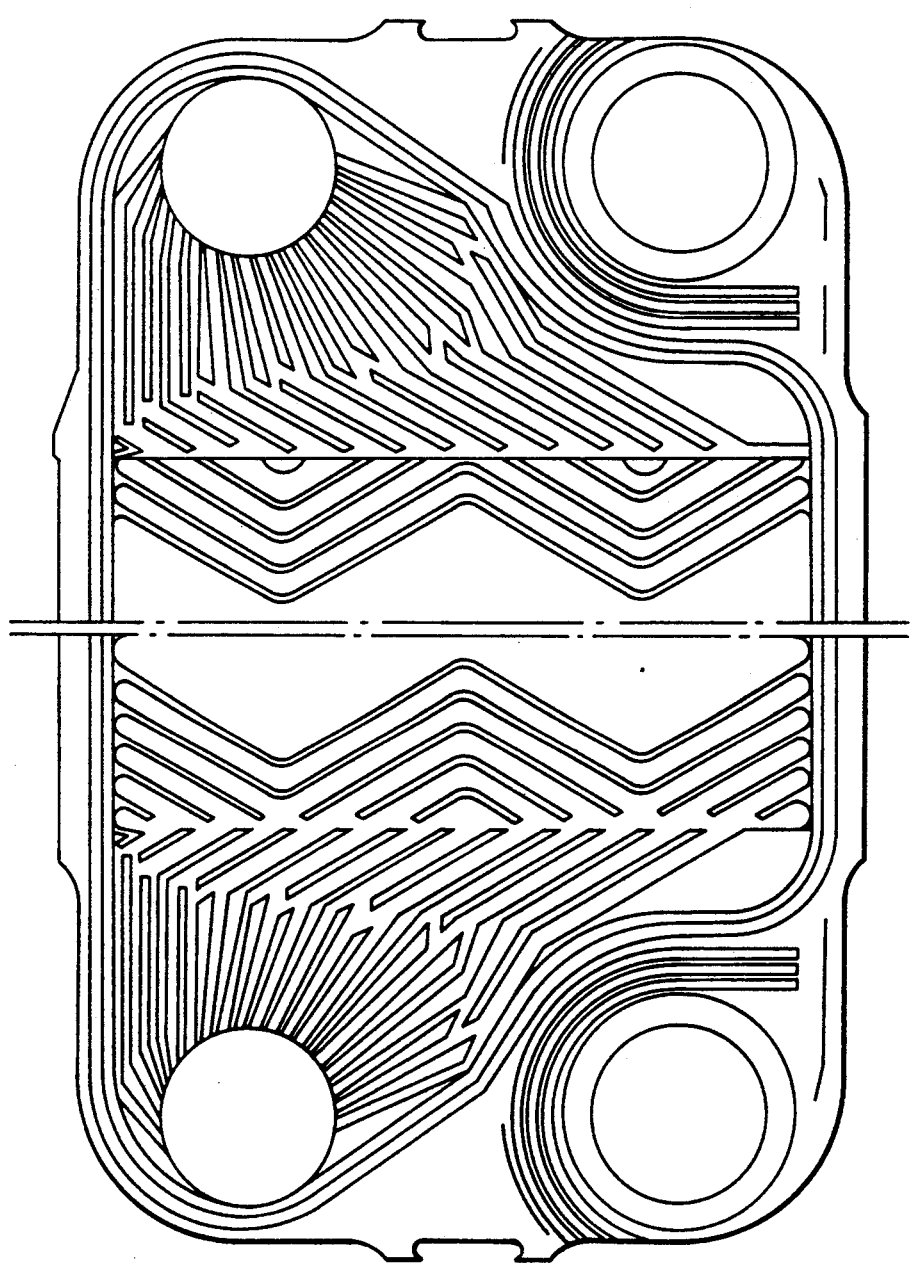

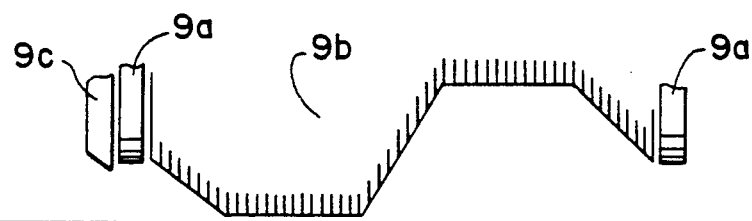
FIG. 12a
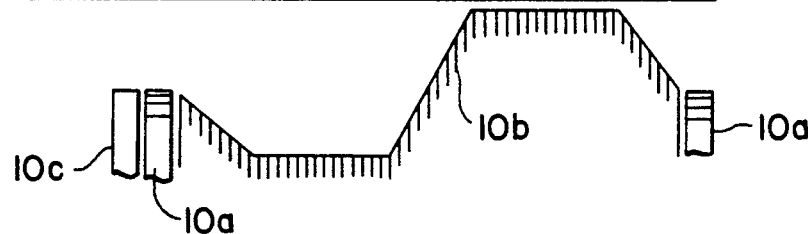
FIG. 12b
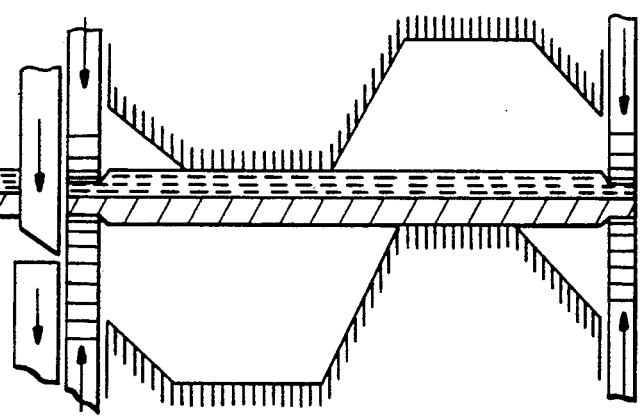
FIG. 12c
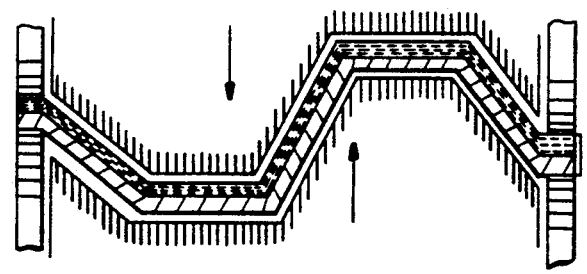
FIG. 12d
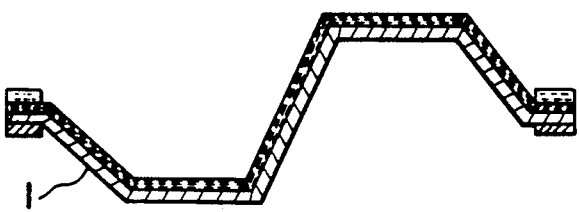

PROCESS FOR PRODUCING SEALING COMPONENTS FROM ALL-CARBON COMPOSITE MATERIAL

FIELD OF THE INVENTION

The invention relates to the field of multilayer materials comprising layers of carbon-carbon composite materials (abbreviated to C-C) and layers of expanded graphite (abbreviated to EG).

DESCRIPTION OF RELATED ART

Materials consisting of layers of C-C composites and layers of EG are known. This association of materials is of the highest usefulness, the layer of C-C composite consisting of a fibrous substrate of carbon fibre and a carbon-containing matrix provides high mechanical characteristics, while the layer of EG affords sealing and flexibility. Where the production of these materials or of articles consisting of these materials is concerned, it is especially advantageous to obtain them from commercial EG strips or sheets rather than by molding techniques from EG particles (the commerical EG strips or sheets are obtained by the compression of EG particles and have a density of the order of 1).

Thus, the document GB 2,205,906 describes a gasket consisting of a central layer of C-C composite between two layers of EG. The production of this gasket involves the hot pressing of the following stack: EG layer/resin-impregnated carbon-fibre substrate/EG layer, leading to a multilayer material which can be designated symbolically by EG/C-C/EG.

Likewise, the document EP 231,787 describes a process for producing tubes by the winding of threads of resin-impregnated carbon fibers, with a sheet of EG intended for ensuring sealing being introduced during the winding. After curing and carbonization of the resin, a multilayer material of the type C-C/EG/C-C is obtained. Finally, Japanese Patent JP 85-247680 describes a process in which alternate layers of EG and of a resin-impregnated fibrous substrate are compressed simultaneously. After curing and carbonization of the resin, a multilayer material is obtained (examples with 3 and 7 layers).

OBJECT OF THE INVENTION

The applicant saw that, in some cases, the multilayer materials obtained from a stack of a EG layer and a C-C layer were not sealing, more specifically when the shaping of the multilayer material resulted in severe deformation, for example with regard to components having parts deviating appreciably from the mid-plane of the component or possessing small radii of curvature.

One object of the invention is to provide a process making it possible to produce sealing components from multilayer material of the type C-C/EG and of a high deformation level.

Another object of the invention is to obtain self-assembly components in devices making use of the assembly of identical components, such as the plates of heat exchangers or of filtration modules. By self-assembly components are meant components which can be assembled simply by pressure, without resorting to other materials or means for ensuring sealing between the components (gaskets, adhesives, etc.), this being very useful in practice.

Another object is to provide a process for the economical production of sealing components with a high deformation level and/or of the self-assembly type, thus making it possible to obtain economical assemblies of these components which are resistant to corrosion and which are thermally stable.

SUMMARY OF THE INVENTION

According to the invention, the process for producing carbon composite components (1) of a large area in relation to the thickness and having an edge (2) and a central part (3), comprising at least one layer of carbon/carbon composite (4) and at least one layer of re-compressed expanded graphite (5), the process involving the stacking and compression of at least one layer of preimpregnate (6) based on a resin-impregnated carbon-fibre sheet and of at least one layer of expanded graphite (7), followed by a curing and a thermal treatment at high temperature, is characterised in that, in order to obtain a sealing carbon composite component (1) with a central part (3) having a high deformation level and/or with an edge (2) allowing the self-assembly of the component, a) there is prepared a stack (8) of at least one layer of preimpregnate (6) comprising a sheet, if appropriate deformable, based on carbon fibers or a precursor of carbon fibers, of an area at least equal to that of the central part, and of at least one layer of expanded graphite (7a) of a specific gravity of between 0.03 and 0.06 and of an area at least equal to the area of the projection of the said component on the mid-plane (11), b) the stack (8) is compressed between a punch (9) and a die (10) of a press under a pressure of between 2.5 and 15 MPa and at a temperature of between 50° and 200° C., in such a way that the thickness of the edge (2) is at least equal to that of the central part (3) and the specific gravity of the expanded graphite is between 0.3 and 0.6 for the edge and between 1 and 1.5 for the central part, c) the compressed component is treated thermally at a temperature of between 400° and 3000° C.

By high deformation level is meant either that a portion of the central part (3) is distant from the mid-plane (11) which can, but does not necessarily coincide with the plane of the edge (2) or its mid-plane in the event of a non-plane edge or that the central part has portions of high curvature.

Quantitatively, it is considered that a portion of the central part is distant from the mid-plane if the ratio between the distance "d" between the portion and the mid-plane and the thickness "e" is greater than 1.5 (d/e>1.5). Likewise, by high curvature is meant a radius of curvature smaller than 5 cm.

These deformation values represent a boundary between two sectors, that of low deformation, for which the processes of the prior art can be used and make it possible to obtain sealing components, and that of high deformation, for which only the invention makes it possible to obtain sealing components. This boundary is relative and merely means that the prior art does not make it possible to produce sealing components of high deformation level with a rate of components rejected for a sealing defect acceptable in industrial practice, the sealing of the components being a factor which is especially critical in the uses envisaged according to the invention.

The applicant studied the factors capable of influencing the sealing of a composite component of typical structure with 3 layers symbolised by C-C/EG/C-C and noted that the laps of EG conventionally used and of a specific gravity in the neighborhood of 1 were unsuitable and that the predominant factor was the specific gravity of the EG during the shaping operation.

The applicant prepared a series of EG strips varying in specific gravity and found that there were two limits to be adhered to: beyond the upper specific gravity limit (0.06), the sealing of the component decreases and it comes nearer to the prior art, while on this side (0.03) the stability and manipulability of the EG strip decreases and its volume per unit mass increases, thus making industrial practice too difficult. In fact, in industrial terms it is convenient to use EG in the form of a strip, continuous or not, which is easy to handle, so that it is possible to employ a shaping of the "stamping" type using two-dimensional laps, rather than a shaping of the "molding" type using bulk materials, and to make it possible to automate the production of composite components and/or to produce components continuously.

The applicant presented the hypothesis that the shaping of a "high specific gravity" EG strip could, where there was high deformation, lead to a cracking of the strip, thus bringing about a reduction of the sealing.

Moreover, the applicant found that the use of low-specific gravity EG also made it possible to obtain self-assembly components, particularly by acting on the differences in specific gravity of the EG and in thickness between the edge (2) and the central part (3). In particular, it is advantageous simultaneously to have an edge thicker than the central part and a EG specific gravity lower for the edge than for the central part, so as to have an edge affording a possibility of residual compression under moderate pressure which, when components are being assembled, makes it possible to obtain sealing between them. The thickness difference between the edge and central part of the component is obtained immediately by acting on a variable spacing between the punch and die. It is advantageous to have a EG specific gravity of between 1 and 1.5 for the central part (3), thus ensuring a good sealing perpendicularly to the component, and of between 0.3 and 0.6 for the edge, thereby ensuring good sealing tangentially relative to the component (sealing between the edge of one component and the edge of an adjacent component in an assembly of components).

To produce components having a central part of high deformation level, it is important, according to the invention, to use a preimpregnate consisting of a deformable sheet of carbon-containing material and therefore preferably of sheets obtained either from short fibres or from randomly oriented fibres, or relatively "loosely" woven sheets. Short-fibre satin laps and felt or mat sheets are suitable according to the invention. Where components with a low deformation level are concerned, a more rigid, for example three-dimensional substrate is also suitable. The substrates or sheets used have a gsm value of between 100 and 500 g/m². The resin content of the preimpregnate is generally between 15 and 35% by weight.

According to a first embodiment of the invention, layers of preimpregnates consisting of a sheet of carbon fibre or of a precursor of carbon fibre, deformable and impregnated with resin, and EG layers of a specific gravity of between 0.03 and 0.06 are stacked. The simplest typical stacks are C-C/EG, C-C/EG/C-C and EG/C-C/EG with the symbolic representation already used, but this list is not limiting. It is expedient to produce a stack from reels just upstream of the shaping press, as illustrated in FIG. 7, and in this case the stack formed feeds a press, as indicated diagrammatically in FIGS. 8a–d.

It is also possible in a known way to cut portions of preimpregnate and EG strip substantially to the dimensions of the component to be obtained, to stack them and to shape them on the press (see FIG. 6).

According to a second embodiment of the invention, at least one of the layers of preimpregnate extends over only a fraction of the surface of the component and more particularly extends over the central part (3) of the component, so that the initial stack before compression and heating can be represented diagrammatically as indicated in FIGS. 8a to c.

By acting on the differential spacing between the punch and die and on the difference in area of the layers of preimpregnate and of EG, there are obtained components, of which the edge, at least as thick as the central part, comprises a EG of a specific gravity of between 0.3 and 0.6, while the EG of the central part has a specific gravity of between 1 and 1.5.

The sealing of an assembly of components according to the invention will become easier if at least one outer layer of the peripheral part is a layer of EG, but preferably the two outer layers of the peripheral part are of EG of a specific gravity of between 0.3 and 0.6.

The invention also includes self-assembly components, the central part of which is plane and the peripheral part of which is thicker than the central part, with outer layers of EG having a specific gravity of between 0.3 and 0.6, as shown in FIGS. 9a and 9b.

Whatever the embodiment or version of the process, after shaping on the heating press there is obtained a component having the desired rigid form as a result of the compression and more or less complete polymerization of the preimpregnation resin, this component being treated at between 400° and 3000° C, in a way known per se. This treatment converts the layer of polymerized preimpregnate into relatively porous C-C composite material, hence the need for an uninterrupted layer of EG to ensure the sealing.

The component obtained according to the invention can be machined according to its final use, but it can be expedient not to have to machine the peripheral part by the use of a press with a punch and die, as shown diagrammatically in FIG. 10, so as to obtain the final dimensions on the press.

The invention makes it possible to extend the use of C-C/EG multilayer materials to components having a high deformation level in sectors of use where it is important to generate a large surface area with a small volume, such as heat exchange and filtration.

The invention makes it possible, above all, to obtain components having the advantage that they can be self-assembled, without the need to provide additional materials or devices, such as an adhesive or a gasket.

It is appropriate to note that the components according to the invention have properties suitable for these uses, with a thermal conductivity ($\lambda/e$) perpendicularly to their local plane of between 5000 and 10000 kcal/h.m.° C. and a sealing of between $10^{-8}$ and $10^{-6}$ cm²/s, thereby making it possible to obtain components of small thickness, but having high mechanical properties which, in terms of corrosion resistance, can advantageously replace stainless-steel plates, for example in plate exchangers and in pervaporation modules.

BRIEF DESCRIPTION OF THE DRAWINGS

FIG. 4 is a top view and FIG. 5 a sectional view along the plane BB' perpendicular to the plane formed by the layers.

FIG. 11 is a photograph of a heat-exchanger plate obtained according to Example 1 of the invention.

FIGS. 12a to 12d illustrate a shaping on the press fed with a stack (8) in the form of a continuous strip and equipped with means (9a and 10a) for blocking the stack, shaping means (9a and 9b) and means for cutting the stack (9c and 10c).

DESCRIPTION OF THE PREFERRED EMBODIMENTS

EXAMPLE 1

Heat-exchanger plates were produced (see photograph in FIG. 11).

For this purpose, portions (of dimensions 750×200 mm) of preimpregnate and EG were cut.

The preimpregnate is a satin of short carbon fibre having a gsm value of 300 g/m² and a content by volume of phenolic resin of 60%.

The EG has a specific gravity of 0.05 and takes the form of a sheet of thickness 20 mm.

A stack comprising two outer layers of preimpregnate and a central layer of EG, which can be designated symbolically by C-C/EG/C-C, was prepared.

Figure 1:
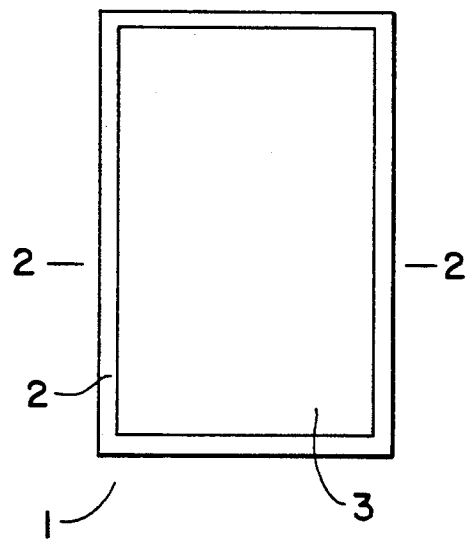
FIG. 1 shows diagrammatically a top view of a component (1) obtained according to the invention, comprising an edge or peripheral part (2) and a central part (3).
Figure 2:
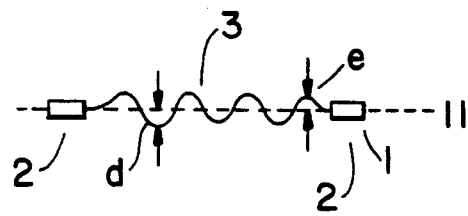
FIG. 2 is a cross-section along the plane AA' perpendicular to the mid-plane (11) of the component. "e" denotes the thickness of the component in its central part and "d" denotes the distance between the mid-plane (11) and the parts of the component the most distant from this mid-plane.
Figure 3:
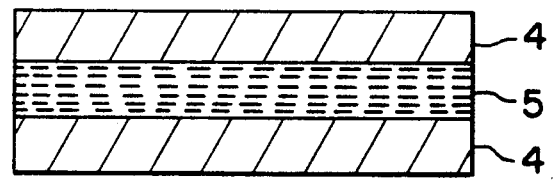
FIG. 3 shows diagrammatically, in cross-section, the structure of a stack of materials C-C(4)/EG(5)/C-C(4) of a component obtained according to the invention.
Figure 4:
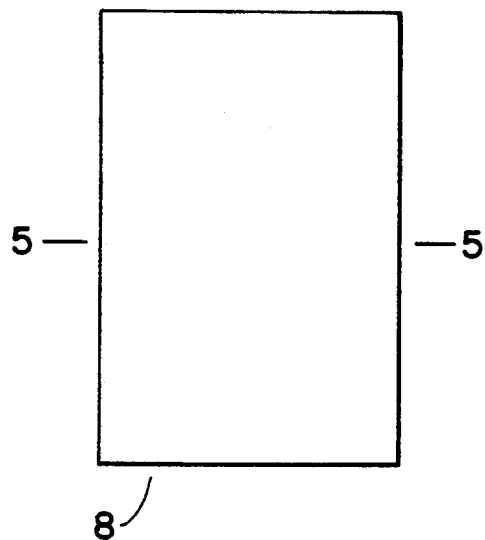
FIGS. 4 and 5 show diagrammatically a stack of layers of preimpregnate (6) and of EG of low specific gravity according to the invention (7a), the layers having substantially the same area.
Figure 5:
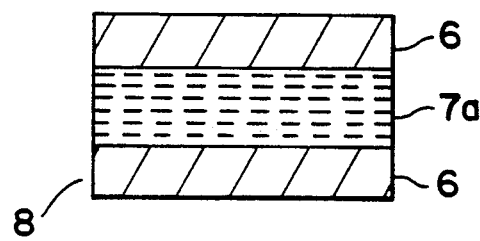
Figure 6:
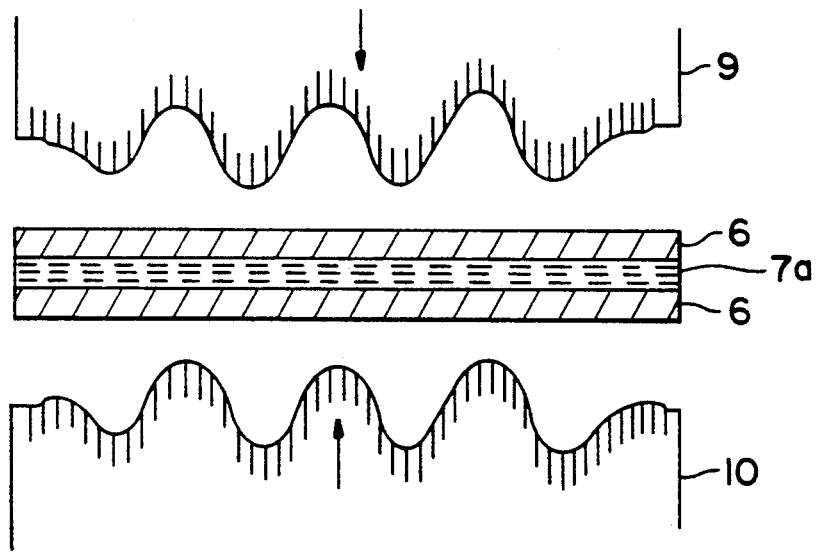
FIG. 6 shows diagrammatically, in a section perpendicular to the plane of the layers forming the stack, a stack portion of an area substantially equal to that of the component to be obtained, between the punch and die of a press equipped with heating means (not shown).
Figure 7:
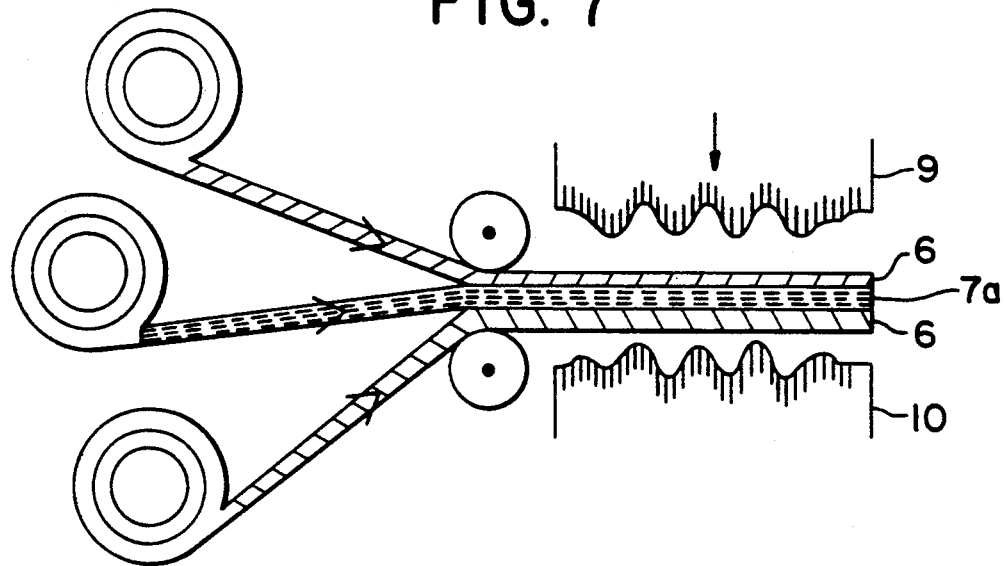
FIG. 7 shows diagrammatically the feeding of a press from 3 reels of starting materials.
Figure 8A:
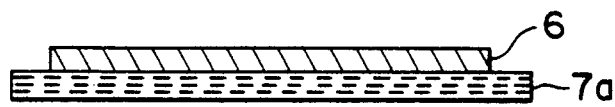
FIGS. 8a to 8c show diagrammatically, in a section perpendicular to the plane of the layers, stacks in which at least one layer of preimpregnate (6) has a reduced area, namely only the area of the central part, whereas all the layers of EG (7a) extend over the entire area.
Figure 8B:
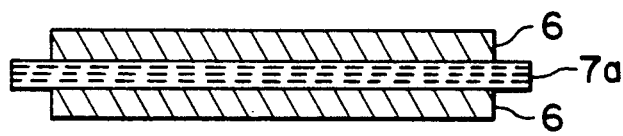
Figure 8C:
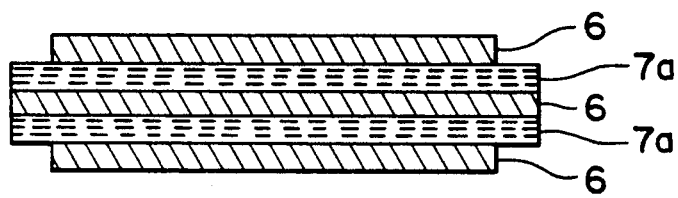
Figure 9:
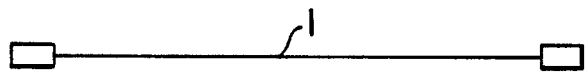
FIG. 9a shows diagrammatically a component with a plane central part and FIG. 9b shows diagrammatically an assembly of these components.
Figure 9A:
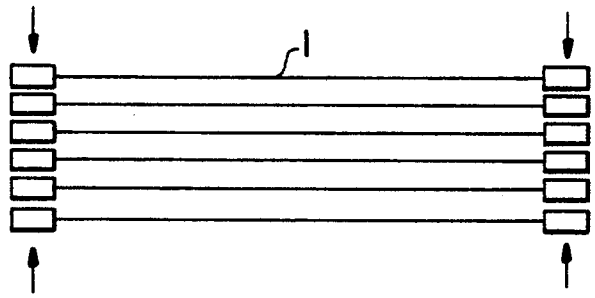
Figure 10:
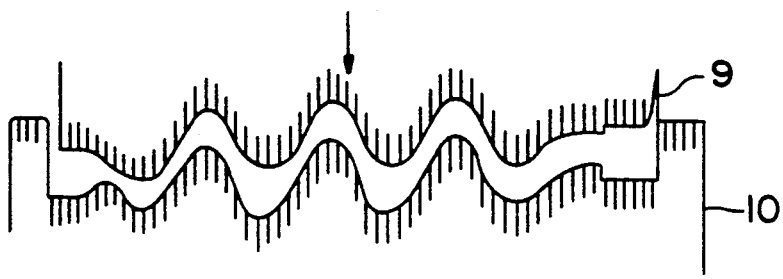
FIG. 10 shows diagrammatically, in section, a press, the punch of which fits perfectly into the die in such a way as to obtain a component to the final dimensions.
Figure 1:
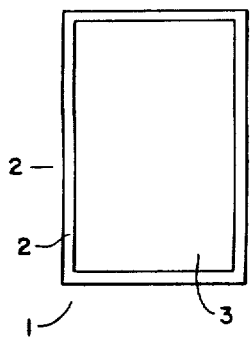
Figure 2:
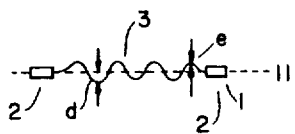
Figure 3:
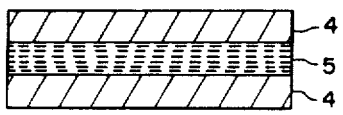
Figure 4:
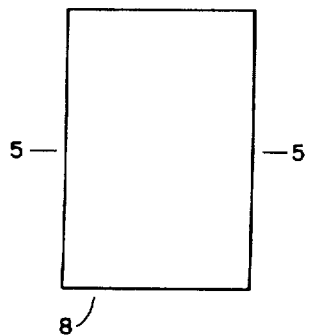
Figure 5:
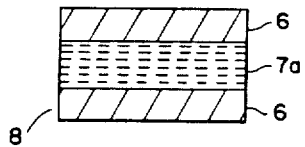
Figure 8A:
Figure 8B:
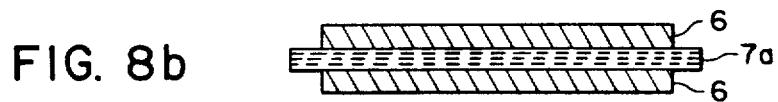
Figure 8C:
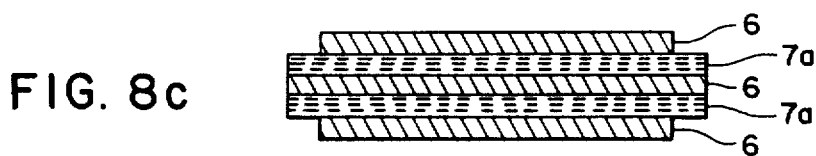
Figure 9:
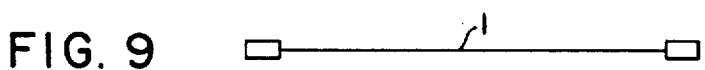
Figure 9A:
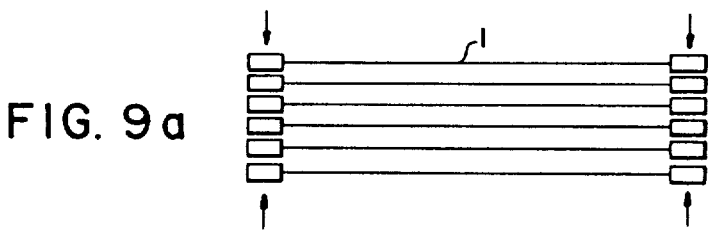
Figure 10:
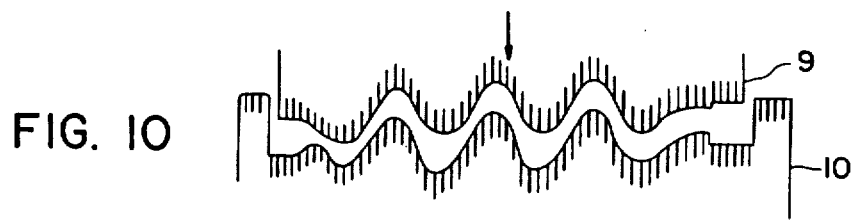

This stack was placed between the punch and the die of a press fitting perfectly one into the other, as shown diagrammatically in FIG. 10, and having the relief indicated in FIG. 11. It was subjected to a pressure of 8 MPa so as to obtain a thickness of 1.5 mm and was brought to 125° C. for 15 minutes. The plate thus obtained was subsequently brought to 1100° C. under a neutral atmosphere for the purpose of coking the resin of the preimpregnate. A plate completely of carbon and having zigzags forming corrugations is obtained:

distance between two peaks: 13 mm
deformation level: $d/e = 2$

The plate obtained is sealing. A plurality of plates so obtained was assembled by means of conventional devices to form an exchanger which was fully satisfactory.

EXAMPLE 2

Plane plates (500 mm×500 mm) intended for the construction of a pervaporation module were produced according to the process described in Example 1, except that:

a preimpregnate, the substrate of which is a twill with long carbon fibres of 250 g/m² and impregnated with phenolic resin (60% by volume) was used. This preimpregnate was cut into squares of 490×490 mm.

EG of a specific gravity of 0.05 and of a thickness of 10 mm was used and was cut into squares of 500×500 mm.

a square of preimpregnate was interposed between two squares of EG to obtain a stack of the EG/C-C/EG type, with the square of preimpregnate centered at 5 mm from the edges of the plates of EG.

this stack was placed in a heating mould composed of a die and of a punch, the profiles of which ensure, after compression, the production of a component having an edge of a thickness of 2.5 mm and a central part of a thickness of 1.5 mm.

finally obtained is a sealing plate made entirely of carbon and having a sealing flexible graphite edge of a specific gravity of 0.4 and which can be used in a prevaporation module and was fully satisfactory.

We claim:

1. Process for producing carbon composite components (1) of a large area in relation to the thickness and having an edge (2) and a central part (3), comprising at least one layer of carbon/carbon composite (4) and at least one layer of recompressed expanded graphite (5), said process comprising the steps of: (a) establishing a stack (8) of at least one layer of preimpregnate (6) based on a carbon-files lap impregnated with carbonisable resin and of at least one layer of expanded graphite (7); (b) compressing the stack; and (c) curing the compressed stack by a thermal treatment at high temperature to obtain a sealing carbon composite component (1) with a central part (3) having a high deformation level and/or with an edge (2) providing self-bonding of the layers of the components, wherein in step (a) the stack (8) is prepared of at least one layer of preimpregnate (6) comprising a sheet, optionally deformable, based on carbon files or a precursor of carbon fibres, of an area at least equal to that of the central part, and of at least one layer of expanded graphite (7a) of a specific gravity of between 0.03 and 0.06 and of an area at least equal to an area of a projection of the said component on the mid-plane (11), and wherein in step (b) the stack (8) is compressed between a punch (9) and a die (10) of a press under a pressure of between 2.5 and 15 MPa and at a temperature of between 50° and 200° C., in such a way that the thickness of the edge (2) is at least equal to that of the central part (3) and the specific gravity of the expanded graphite is between 0.3 and 0.6 for the edge and between 1 and 1.5 for the central part, and wherein in step (c) the compressed component is treated thermally at a temperature of between 400° and 3000° C.

2. Process according to claim 1, wherein in step (A) at least one layer of preimpregnate (6) extends only over the part corresponding to the central part (3) of said component.

3. Process according to claim 1, wherein the central part (3) is compressed to a greater extent than the edge (2) as a result of a distance between the punch and die smaller in the region of the central part than in the region of the edge, and optionally by means of a stack of greater thickness in the region of the central part than in the region of the edge.

4. Process according to any one of claims 1 to 3, wherein, in order to produce a component with a central part of high deformation level, there is used a preimpregnate (6) obtained from a deformable substrate based on carbon fibers or a precursor of carbon fibers and consisting of fibres selected from the group consisting of short-fiber fabrics, felt and mats.

5. Process according to any one of claims 1 to 3, wherein, in order to produce a component with a central part of low deformation level, there is used a preimpregnate (6) obtained from a substrate based on carbon fibers or a precursor of carbon fibers and a deformable or nondeformable, substrate.

6. Process according to any one of claims 1 to 3, wherein the preimpregnate (6) is obtained from a carbon-containing substrate having a gsm value of between 100 and 500 g/m².

7. Process according to any one of claims 1 to 3, wherein in step (a) the stack (8) is formed of layers selected from the grouped layers consisting of C/G, C/G/C, and G/C/G, in which C represents one or more layers of preimpregnate (6), each having an area at least equal to that of the central part (3) of the component, and G represents a layer of expanded graphite (7a) of a specific gravity of between 0.03 and 0.06.

8. Process according to any one of claims 1 to 3, wherein in step (A) a press is used for compressing the stack (8), comprising annular means (9a and 10a) making it possible to block the periphery of the stack (8), means (9c and 10c) making it possible to cut the stack (8) to the dimensions of the component (1) to be obtained, and means (9b and 10b) making it possible to carry out the compression and possible deformation of the component.

* * * * *

UNITED STATES PATENT AND TRADEMARK OFFICE
CERTIFICATE OF CORRECTION

PATENT NO. : 5,180,459

DATED : January 19, 1993

INVENTOR(S) : Jean-Michel BAUER et al

It is certified that error appears in the above-identified patent and that said Letters Patent is hereby corrected as shown below:

Column 1, line 25, change "density" to --specific gravity--.

Column 5, line 7, change "AA'" to --2-2--.

Column 5, line 20, change "BB'" to --5-5--.

Claim 1, column 6, line 56, change "files" to --fibres--.

Claim 2, column 7, line 3, change "A" to --a--.

Claim 8, column 8, line 16, change "A" to --a--.

Drawing Sheets 1 and 3 should be delete to be replaced with the drawing sheets consisting of Figs. 1-10, as shown on the attached pages.

Column 6, line 45, "files" should read --fiber--.

Signed and Sealed this

First Day of March, 1994

*Attest:*

BRUCE LEHMAN

*Attesting Officer*     *Commissioner of Patents and Trademarks*